United States Patent [19]

Toyomura et al.

[11] 4,164,789
[45] Aug. 14, 1979

[54] ELECTRONIC APPARATUS FOR DEALING WITH NUMERICAL INFORMATION

[75] Inventors: Sigeru Toyomura, Kawasaki; Tsuyoshi Kawanabe, Yokohama, both of Japan

[73] Assignee: Canon Kabushiki Kaisha, Tokyo, Japan

[21] Appl. No.: 867,503

[22] Filed: Jan. 6, 1978

Related U.S. Application Data

[63] Continuation of Ser. No. 730,083, Oct. 6, 1976, abandoned.

[30] Foreign Application Priority Data

Oct. 23, 1975 [JP] Japan .................................. 50-127770

[51] Int. Cl.² .......................... G06F 3/00; G06F 15/20
[52] U.S. Cl. .................................................. 364/710
[58] Field of Search ............................. 364/710, 715; 235/60 AP, 61 PK, 61.9 R

[56] References Cited

U.S. PATENT DOCUMENTS

| | | | |
|---|---|---|---|
| 3,047,228 | 7/1962 | Bauer et al. | 364/200 |
| 3,872,289 | 3/1975 | Kawanabe et al. | 364/710 |
| 3,976,975 | 8/1976 | Cochran | 364/710 X |
| 3,999,050 | 12/1976 | Pitroda | 364/705 X |

Primary Examiner—Jerry Smith
Attorney, Agent, or Firm—Fitzpatrick, Cella, Harper & Scinto

[57] ABSTRACT

A calculator provided with a key for entering decimal point data and a memory device for storing data therein is disclosed. Such calculator has a control device responsive to the operation of the key for entering decimal point data to cause the memory device to store a plurality of decimal point data. The stored decimal point data is then visualized.

9 Claims, 9 Drawing Figures

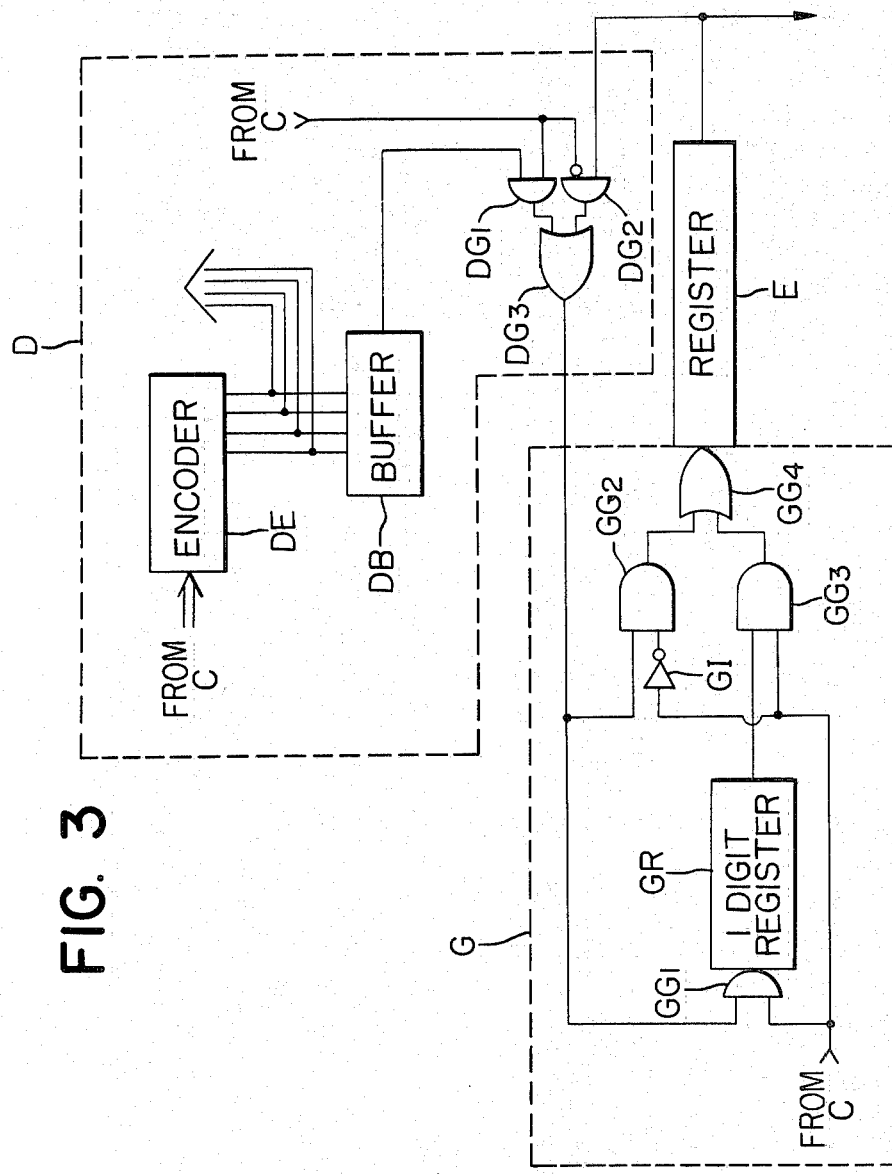

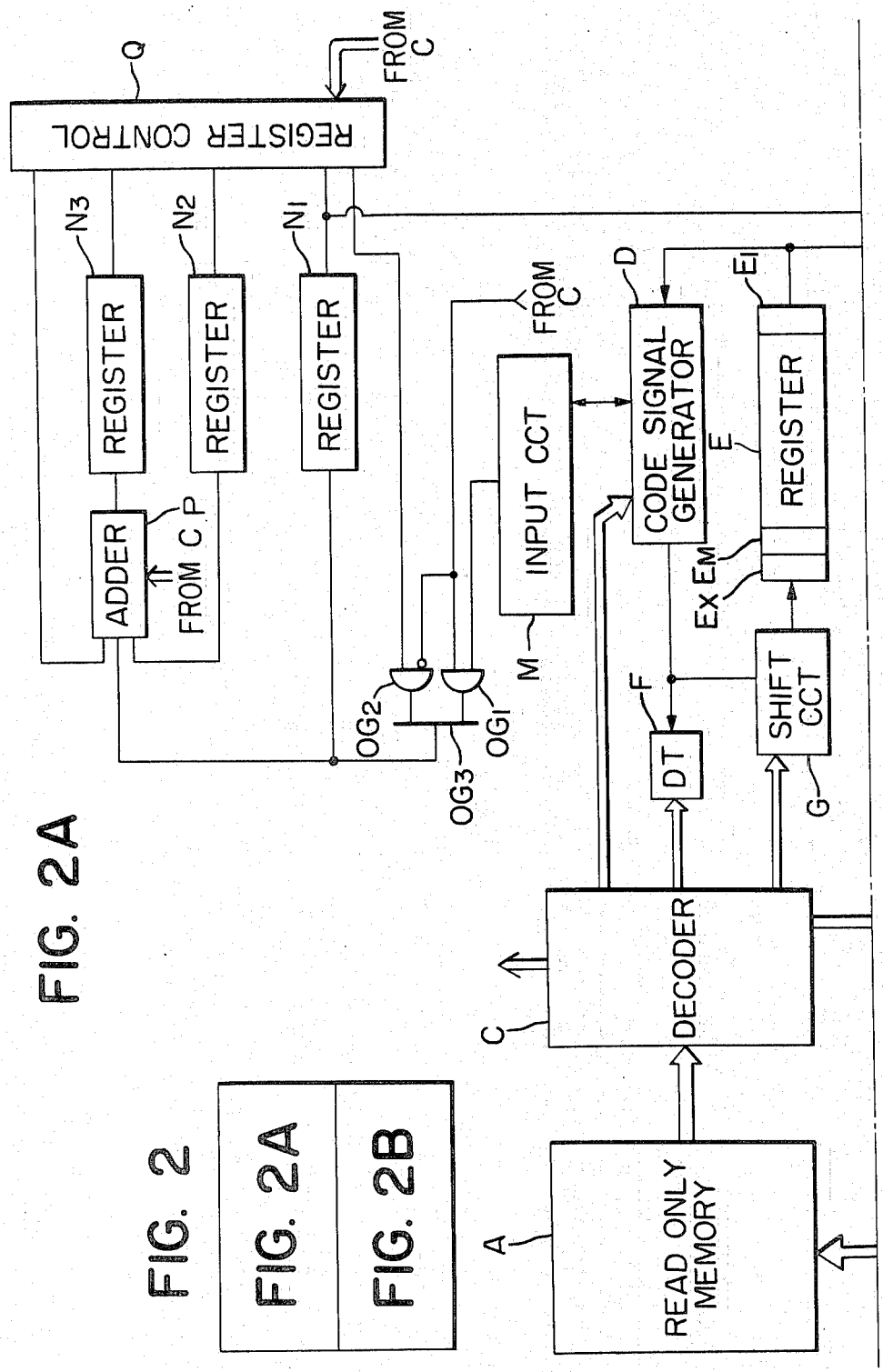

```
#1975·9·3
              1·+
              2·+
              3·*
#001
              3·+
#002
              4·+
#003
              5·+
             12·*
```

```
              GRAPHIC PRINT
                  THE
TEST MARKS    NUMBER 40           3      #40···
   50           7      #50·······
   60           4      #60············
   70          10      #70··········
   80           6      #80······
   90           3      #90···
```

ELECTRONIC APPARATUS FOR DEALING WITH NUMERICAL INFORMATION

This is a continuation, of application Ser. No. 730,083 filed Oct. 6, 1976 and now abandoned.

BACKGROUND OF THE INVENTION a. Field of the Invention

This invention relates to a calculator.

b. Description of the Prior Art

The electronic desk-top calculator having the journal printing function, for example, has heretofore been provided with a non-add key in addition to the keys for executing four fundamental arithmetic operations. The non-add key serves to instruct the calculator to print the contents of the register thereof, and this key is commonly called the "#" key and used to print the data or item numbers during calculation of the total of sales accounts or other calculations. Operation of such key facilitates arrangement or check-up of the results of calculations.

An example of the printing effected by the conventional "#" key is shown in FIG. 1 of the accompanying drawings. According to the prior art, printing of a date, for example, Sept. 3, 1975, is carried out in the form of #1975.93 as shown in FIG. 1. In this case, the year "1975" and the month "9" are clearly distinguishable from each other by the point symbol, whereas no point symbol is present between the month "9" and the day "3" and these are difficult to distinguish therebetween. This is because the point symbol has been used only for the distinction between the integer portion and the decimal fraction of a number and maximum one point symbol could only be inserted in the numeric data entered, and thus the numeric data could not be divided into two or more. This has been very inconvenient.

SUMMARY OF THE INVENTION

It is an object of the present invention to improve the calculator in the above-noted points and to provide a calculator wherein data classification information for distinguishing between the data displayed or printed out may be output as required.

It is another object of the present invention to provide a calculator which enables check-up or arrangement of the results of calculations and also enables the data and the items to be clearly distinguished.

It is still another object of the present invention to provide a calculator which can store input data in a plurality of forms and select one of the contents stored in such forms.

To achieve these objects, the calculator according to the present invention comprises means for entering numeric data into the calculator, means for entering decimal point data into the calculator, means for storing data therein, and means responsive to the means for entering decimal point data to cause the memory means to store a plurality of decimal point data.

Other objects of the present invention will become apparent from the following detailed description of some embodiments of the invention taken in conjunction with the accompanying drawings.

BRIEF DESCRIPTION OF THE DRAWINGS

FIG. 1 shows an example of the printing according to the prior art.

FIG. 2 comprising FIGS. 2A and 2B is a block diagram showing an embodiment of the calculator according to the present invention.

FIG. 3 is a block diagram of the circuit D and the shift circuit G shown in FIG. 2.

DESCRIPTION OF THE PREFERRED EMBODIMENTS

Figure 2B:
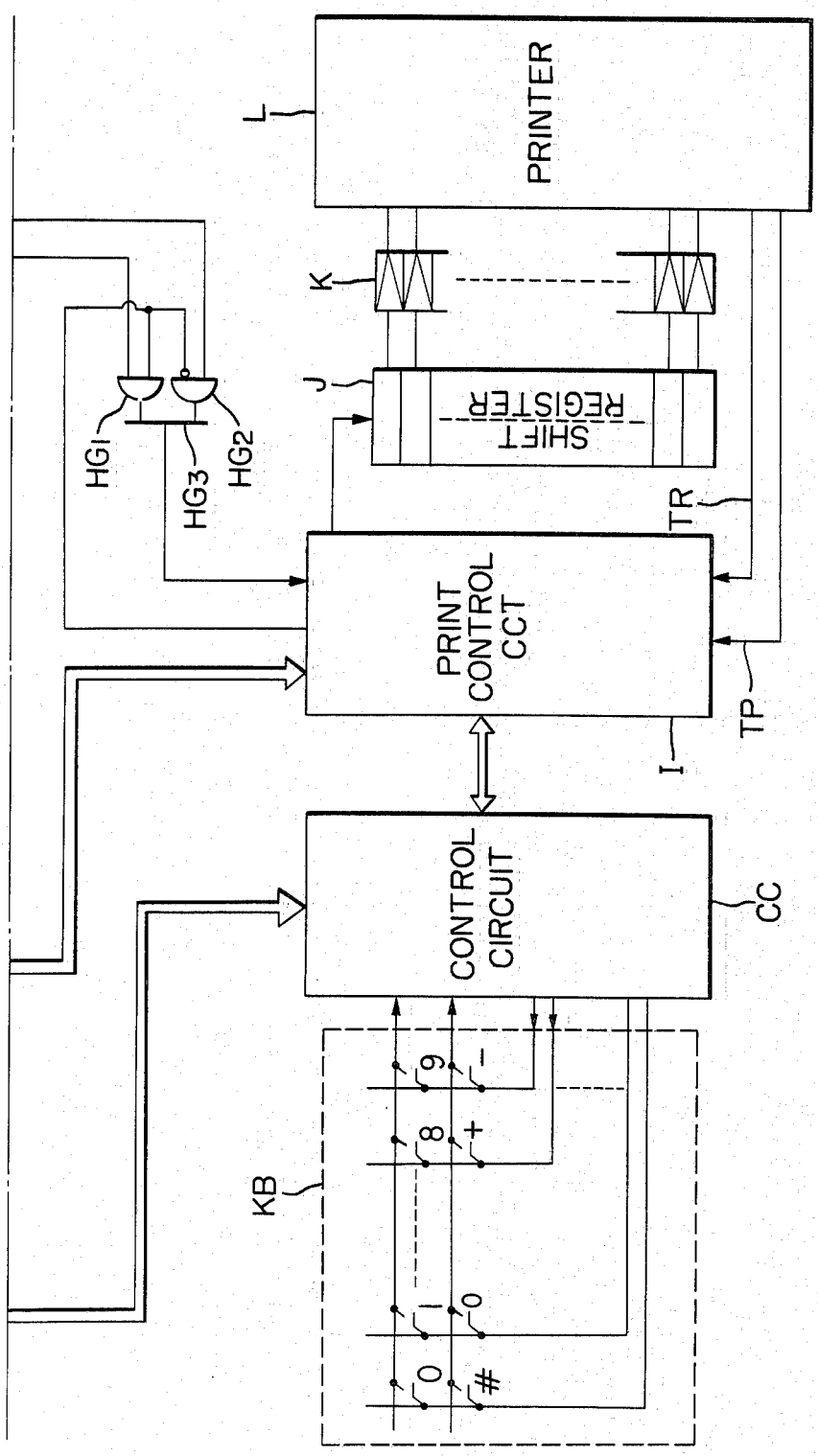

Referring to FIG. 2, it shows in block diagram an embodiment of the calculator according to the present invention.

Designated by KB is a keyboard for entering data such as numbers and instructions into the calculator. On the keyboard KB, there are arranged various keys, namely, numeric keys "0" to "9," function keys for the four fundamental rules of arithmetics, and non-add "#" key. CC designates a control circuit for discriminating between the types of operated keys upon reception of key signals put out from the keyboard and effecting successive controls. Designated by A is a read-only memory (ROM) for storing therein microinstruction data for successive controls and generating different microinstruction data in accordance with the communication with the control circuit CC.

C denotes an ROM decoder for receiving the data from the read-only memory A and discriminating the data.

D is a circuit for generating sixteen types of code, i.e., 4-bit codes for 0 to 9 and A to F in accordance with the signals from the ROM decoder C and applying such code signals to a circulating register which will hereinafter be described. As is particularly shown in FIG. 3, the circuit D comprises an encoder DE, a buffer register DB of the parallel input and serial output type for storing the code signals, and control gates $DG_1$, $DG_2$ and $DG_3$ for applying information as input to the circulating register. Such circuit D serves to convert the signals from the ROM decoder C into 4-bit code signals by the encoder DE and apply these code signals to the buffer register DB. The signals stored in the buffer register DB are serially applied through the control gates $DG_1$ and $DG_2$ into the circulating loop of the circulating register E. The control gate $DG_1$ is opened and closed by the signal from the ROM decoder C, and the control gate $DG_2$ forming the circulating loop is closed and opened by the signal from the ROM decoder C. Designated by E is a circulating register of 1-digit 4-bit design for holding numeric or symbolic data. F is a circuit for detecting whether or not numeric or symbolic data is stored in the second most significant digit place $E_M$ of the circulating register E. G is a shift circuit for shifting the numeric or symbolic data in the circulating register E to the left by one digit (namely, to an adjacent more significant digit place). As is particularly shown, the shift circuit G comprises a 1-digit register GR, control gates $GG_1$, $GG_2$, $GG_3$, $GG_4$ and an inverter GI, so that when no left shift is effected by the signal from the ROM decoder C, the data for the register E enters the register E through the control gates GG$_2$ and GG$_4$. When a left shift is effected, the data for the register E enters the register E through the control gate GG$_1$, the register GR and the control gates GG$_3$, GG$_4$. Designated by I is a printer control circuit for receiving the data from the circulating register E through control gates HG$_1$, HG$_2$, HG$_3$, counting a drum position detection signal TP from a printer L to take coincidence between the TP counter (not shown) and the data from the register E, sending a coincidence data to a further register which will later be described, and effecting other necessary print controls for printing. J designates a static shift register for receiving the coincidence signal from the printer control circuit I and passing it through an amplifier K to the printer L. The printer L may effect printing on printing paper by its hammer driven by the signal from the amplifier K. M is a circuit for receiving the encoder output of the circuit D as input and applying numeric or decimal point data to a circulating register N$_1$.

Designated by OG$_1$, OG$_2$ and OG$_3$ are control gates for the data applied from a circuit M to the register N$_1$. N$_2$ is a register for receiving numeric or decimal point data as input, and N$_3$ an operational register connected to an adder circuit P to process the data from the registers N$_1$ and N$_2$. Denoted by Q is a control circuit having control gates for transferring the data in the registers N$_1$, N$_2$, N$_3$.

Description will now be made of operation of the embodiment constructed as described above. As an example, printing of a date "1975.9.3" by the use of "#" key will be shown hereinafter.

Figure 4:
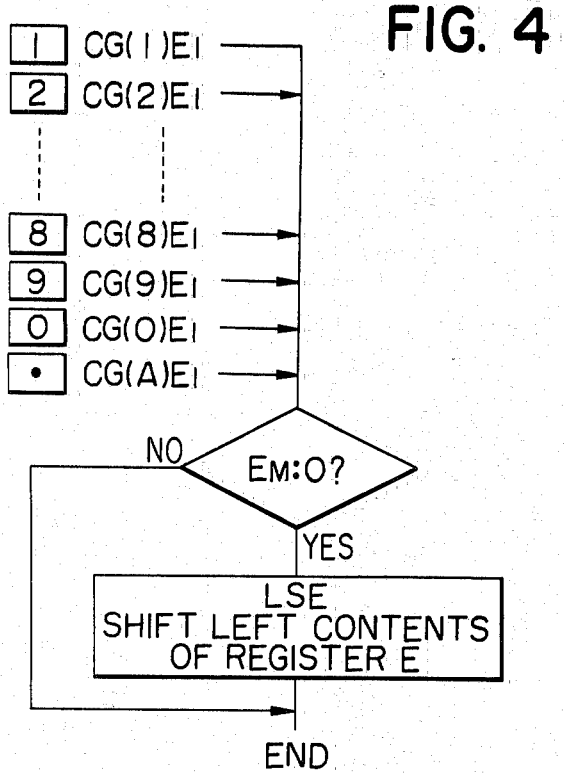
FIG. 4 illustrates the controls effected in the block diagram of FIG. 2.

First, a numeric key "1" is depressed, whereupon the depression of this numeric key "1" is detected by the control circuit CC. This is reported to the read-only memory A, from which successive instructions for storing the digit "1" in the circulating register E are put out to the ROM decoder C. The ROM decoder C decodes these instructions and causes the circuit D to generate "1," which is entered into the least significant digit place E$_1$ in the circulating register E. Thereafter, for a subsequent numeric key, the detecting circuit F detects whether or not data are stored in the other digit places up to the second most significant digit place E$_M$ in the circulating register E and if no data is stored in the digit places up to E$_M$, the data in the circulating register E is shifted to the left by one digit (namely, to an adjacent more significant digit place), thus emptying the least significant digit place E$_1$. Such control is illustrated in FIG. 4. In this Figure, CG(1)E$_1$ means that the code "1" is generated by the circuit D and entered into the least significant digit place E$_1$ in the circulating register E.

Subsequently, a numeric key "9" is depressed, whereupon a process similar to that already described takes place and a code "9" is entered into the circulating register E.

Depression of numeric keys "7" and "5" is also followed by a process similar to that described above. Next, depression of a point key "." is again followed by a similar processing with the exception that a code representative of the point generated by the circuit D is stored as "A" in the least significant digit place in the circulating register E.

Thereafter, operations of keys "9," "." and "3" are processed in a manner similar to that described above.

Thus, data 1975A9A3 are finally stored in the circulating register E. While the input data from the keyboard KB remains stored in the register E as described, substantially the same data as those in the register E are entered into the register N$_1$. The contents of the register N$_1$ are such that the data "1," "9," "7," "5," ".," "9," "." and "3" are successively delivered thereinto from the encoder DE in the circuit D, but when the point "." next to "5" is entered, decimal point data is entered into the digit place in the register N$_1$ for storing a decimal point and, when "9" is entered, a digit data is entered into the digit place for memorizing the digit position of the decimal point. When a subsequent decimal point is entered, the digit position data is cleared and the data of the digit position again becomes 0. Subsequently, when "3" is entered, the content of the digit position data becomes 1 and after all, the contents of the register N$_1$ thus comprise 19759.3. This means that the first decimal point data is judged as wrong.

Figure 5:
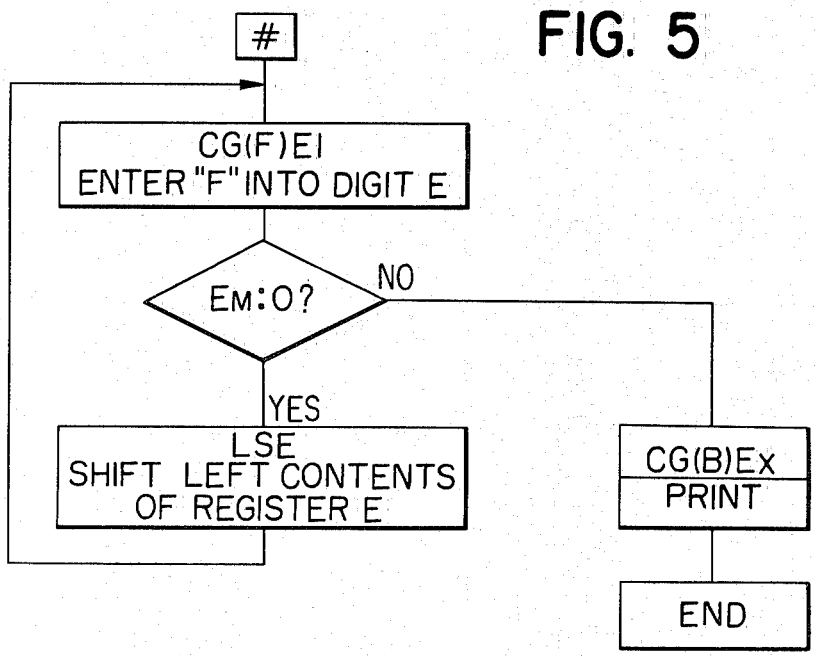
FIG. 5 illustrates the controls effected in the block diagram of FIG. 2.

Next, the "#" key is depressed, whereupon an instruction is put out from the read-only memory A to effect the control as illustrated in FIG. 5.

First, the data are shifted to the left up to the digit place E$_M$ in the circulating register E to print the data on the right-hand side of printing paper, but the detecting circuit F detects whether or not data is present in the digit place E$_M$ in the circulating register E and if no data is present in the digit places up to E$_M$, the data are shifted to the left by one digit by the shift circuit G. When this occurs, a suppress load "F" is entered into the least significant digit place E$_1$ from which the data has been cleared by the one-digit left shift having been effected. This is in order to suppress the less significant digit places other than the data-containing portion when printing of data is effected from left to right on printing paper. The above-described left shift is effected up to the digit place M, and a code "B" is generated by the circuit D and entered into the digit place X to print the mark "#".

By these processes, the data in the circulating register E become B1975A9A3 FFFFFFF if the register E consists of sixteen digit places. In order that these data may be printed, the data are delivered to the printer control I, which thus counts the drum position detection signal TP of the printer and takes coincidence between the TP counter (not shown) and the data in the circulating register E and delivers the coincidence data to the static shift register J to parallel-drive the hammers of the printer L through the amplifier K, whereby "#1975.9.3" is printed as shown in FIG. 6.

The data 19759.3 entered into the register N$_1$ are cleared by the output of the ROM decoder C receiving a signal generated by the read-only memory A upon depression of the "#" key or a key next thereto.

If, instead of the "#" key, the key for instructing or executing four fundamental arithmetic operations is operated, the content of the register E$_1$ is cleared.

Figures 6, 7, 8:
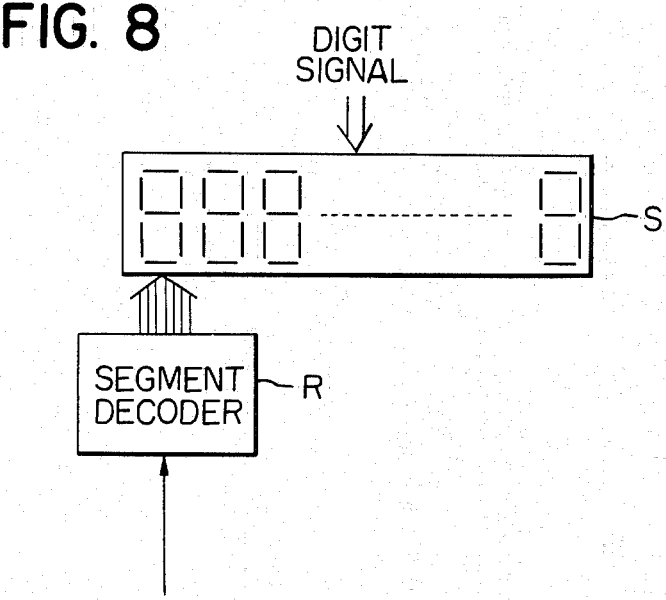
FIG. 6 shows an example of the printing effected by the calculator according to the present invention.
FIG. 7 shows another example of the printing.
FIG. 8 is a block diagram showing another embodiment of the calculator according to the present invention.

When calculation is to be effected in the above-described embodiment and in accordance with FIG. 6, an opened "1" entered from the keyboard KB is located in the register N$_1$ as already described. Next, the add instruction "+" key is operated, whereupon the data "1" is added to the data in the register N$_3$ (this latter data is initially 0), and the result of the addition remains in the register N$_3$.

By the "+" key having been operated, the data "1" in the register N$_1$ is delivered to the printer control circuit I and when it is coincident with the content of the TP counter, it is delivered to the register J and thence through the amplifier K to the printer L, whereby the data "1" with the symbol "+" is printed as shown in FIG. 6.

Subsequently, an operand "2" is entered from the keyboard into the register $N_1$ and by the next depression of the "+" key, a performance similar to that described previously takes place to effect printing of data, while the result of the addition remains in the register $N_3$. Subsequently, a grand total "*" key (not shown) is depressed, whereby the result of the addition 1+2 is printed. In this manner, the result as shown in FIG. 6 may be obtained.

FIG. 7 illustrates another example of the printing on the calculator according to the present invention. As seen, a plurality of point symbols may be entered so that a simple graph can be formed.

FIG. 8 shows another embodiment in which display is accomplished by a segment type thermal head or a conventional display tube. Designated by R is a segment decoder to which is applied display data from the control gate $HG_3$ shown in FIG. 2, and the output of such segment decoder is in turn applied to a display device S.

Alternatively, the digit signal for such display device S may be supplied from the control circuit CC or one end of the matrix of the keyboard KB.

This display device can perform the same function as that already described and enables the contents of the displayed data to be clearly distinguished.

A function similar to that described previously may be provided even if the thermal head is of one-digit type.

If it is desired to make clear the distinctions between the year, the month and the day in the data, means may be provided for discriminating between the entered data of the year, the month and the day, whereby when the "#" key is operated under the control of the read-only memory A, marks of distinction may be automatically inserted between the year, the month and the day. In such or other cases, the marks of distinction may be symbols such as hyphen (-), comma (,) or other special pattern symbol.

What we claim is:

1. Electronic calculating apparatus for dealing with numerical information comprising:
    a key input device provided with numerical keys for entering numerical data signals, a decimal point key for entering a decimal point signal and instruction keys for entering instruction signals;
    a first memory for storing numerical data signals and data classification mark signals, wherein the data classification mark signals are represented by decimal point signals entered by said decimal point key;
    a second memory for storing numerical data signals and a single decimal point signal;
    control means for causing said first memory to store a plurality of data classification mark signals and for causing said second memory to store a single decimal point signal providing a distinction between the integer and decimal portions of the numerical data, when said decimal point key is depressed repeatedly; and
    means, responsive to the operation of a specified one of said instruction keys, for reading out the signals stored in said first memory.

2. Electronic calculating apparatus according to claim 1 further comprising means for visualizing as dot marks the plurality of data classification mark signals read out from said first memory by said read out means.

3. Electronic calculating apparatus according to claim 1, wherein said control means controls said second memory to reposition the decimal point signal stored therein whenever said decimal point key is depressed.

4. Electronic calculating apparatus for dealing with numerical information comprising:
    data classification entry means for entering data classification signals into the apparatus;
    manual switch means for changing the treatment of the data classification signals which have been entered from said data classification entry means;
    storage means for storing the data classification signals from said data classification entry means; and
    control means, responsive to the operation of said data classification entry means, for causing said storage means to store a number of classification signals corresponding to the number of successive operations of said data classification entry means when said manual switch means is operated, and for causing said storage means to store a single data classification signal as a decimal point signal providing a distinction between the integer and decimal portions of numerical data when said manual switch means is not operated.

5. An apparatus according to claim 4 wherein said storage means comprises a first memory, a second memory and a third memory, wherein said control means causes said first memory to store data classification signals while simultaneously causing said second memory to store a single decimal point signal, and wherein in accordance with the operation of said manual switch means, data from one of said first and second memory means is transferred to said third memory.

6. An apparatus according to claim 4 further comprising means for visualizing the plurality of data classification signals stored in said third memory as a plurality of dot marks.

7. Electronic calculating apparatus for dealing with numerical information comprising:
    a keyboard having numerical keys for entering numerical data, data classification entry keys for entering data classification signals and instruction keys for entering a plurality of instructions;
    control means, responsive to the operation of said data classification entry key, for causing the data classification signals, corresponding in number to the number of successive operations of said data classification entry key, to be treated as true information when a specified one of said instruction keys is operated after said data classification entry key is operated, and for causing a single data classification signal to be treated as a decimal point signal providing a distinction between the integer and decimal portions of numerical data when any one of the remaining instruction keys is operated after said data classification entry key is operated.

8. An apparatus according to claim 7 wherein said control means causes a first memory to store a plurality of data classification signals while causing a second memory to store a single data classification signal as a decimal point signal.

9. An apparatus according to claim 8 further comprising means for visualizing the plurality of data classification signals stored in said first memory.

* * * * *